N. A. DIDIERJEAN.
MULTIPLE SPEED DRIVING GEARING.
APPLICATION FILED APR. 22, 1905.
954,672.
Patented Apr. 12, 1910.
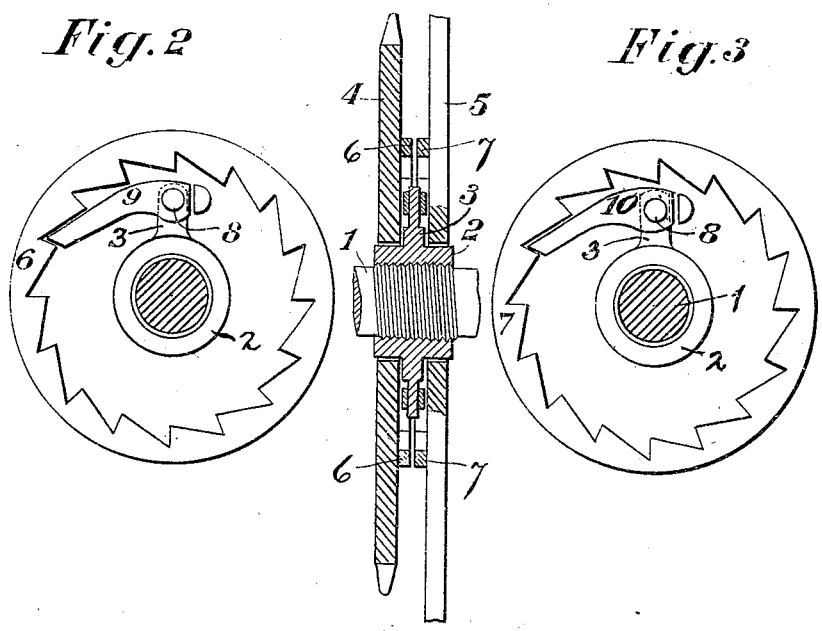
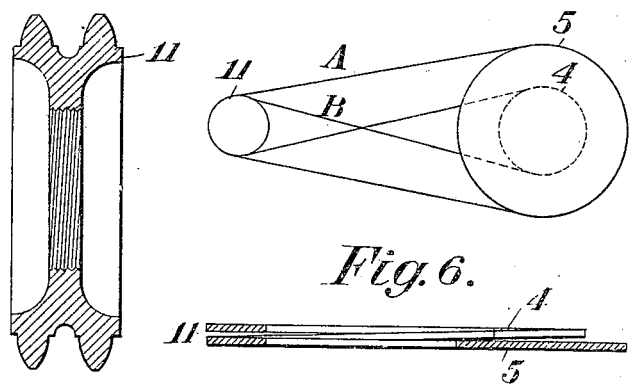
Witnesses:
Inventor:
Nicolas Alexis Didierjean
By Wm E Boulder
Attorney

UNITED STATES PATENT OFFICE.

NICOLAS ALEXIS DIDIERJEAN, OF ST. QUENTIN, FRANCE.

MULTIPLE-SPEED DRIVING-GEARING.

954,672.      Specification of Letters Patent.      Patented Apr. 12, 1910.

Application filed April 22, 1905. Serial No. 256,879.

*To all whom it may concern:*

Be it known that I, NICOLAS ALEXIS DIDIERJEAN, a citizen of the French Republic, and resident of St. Quentin, Aisne, France, have invented certain new and useful Improvements in Multiple - Speed Driving-Gearing for Cycles, of which the following is a specification.

This invention has reference to an improved multiple-speed driving-gearing for cycles and it consists, broadly, in employing two loose chain-wheels of different diameters adapted to be operated by the pedal cranks in opposite directions, and a single chain wheel having two crowns of equal diameter fixed on the back hub, forming in effect two chain wheels, said four chain wheels being encircled by an ordinary cycle chain as hereinafter described, the arrangement being such that in pedaling in one direction one speed is attained and in the reverse direction a different speed.

In the annexed drawings given by way of example:—Figure 1 is a view, partly in section, of the pedal hub fitted for two speeds; Figs. 2 and 3 show in partial elevation the two chain wheels shown in Fig. 1; Fig. 4 is a section through its axis of the double crown chain wheel which is mounted in the back hub; Figs. 5 and 6 show diagrammatically, in elevation and in plan respectively, the arrangement of the chain on the chain wheels, for two speeds.

The pedal hub represented in Figs. 1 to 3 comprises an ordinary shaft or spindle 1, on which a sleeve 2 having a central peripheral rib or shoulder 3 (Fig. 1) is fixed by means of a thread or otherwise. On said sleeve I mount two loose chain wheels 4 and 5, of different diameters, one on either side of the shoulder and carrying internally-toothed ratchets 6 and 7 respectively. These ratchets are arranged oppositely to each other. Pins 8 which carry pawls 9 and 10 are passed through the shoulder 3 at diametrically opposite points. The pawls situated on one side of the shoulder are adapted to act in the opposite direction to those situated on the other side, so as to actuate the one chain wheel in a forward direction and the other backward.

On the back hub, two crowns of equal diameter,—or rather a single wheel 11 having a double crown (Fig. 4)—are mounted, and a single chain is mounted on said two crowns and the two driving wheels 4 and 5 so as to connect the upper part of the larger wheel 5 (Figs. 5 and 6) with the first crown, encircle this and pass to the upper part of the smaller wheel 4, after encircling which it passes to the upper part of the second crown, encircles it and passes to the lower part of the larger wheel 5. It will be understood of course that this arrangement may be reversed if desired. This arrangement is intended for two-speed bicycles.

As to the chain wheels they act always the same whatever be the manner of pedaling, that is to say they always rotate the double crown on the back hub in a forward direction and the two pedal driving wheels always rotate in opposite directions. When one of these wheels is actuated the other turns freely and simply plays the part of a reel for the chain for its working companion. The rider may pedal either forward or backward: there is complete and absolute reversibility. The only difference which results from the two ways of pedaling is that the speed transmitted is increased or decreased relatively to the difference of diameter of the driving wheels.

In running down hill, the cranks remain at rest. Owing to the symmetrical arrangement of the chain there is practically no difference to the eye between a cycle fitted with my driving gear and the ordinary arrangement. Further, my improved gear may be made at less cost than would be otherwise possible.

Having now fully described my said invention, what I claim and desire to secure by Letters Patent is:

In a multiple-speed driving gearing the combination with a sleeve having a central peripheral rib, and two chain wheels 4 and 5, of different diameters mounted loosely on said sleeve, one on either side of said rib, of a ratchet on each of said chain wheels, pawls mounted on said rib, said ratchets and pawls being arranged to operate in opposite directions, a chain wheel 11 formed with two crowns of equal diameter, and a single chain passing over the said chain wheels 4, 5, and the crowns of the chain wheel 11, in the manner described.

In testimony whereof I have hereunto set my hand in presence of two witnesses.

NICOLAS ALEXIS DIDIERJEAN.

Witnesses:
    ALFRED C. HARRISON,
    NOËL DHULET.